US012326578B2

(12) United States Patent
Teng et al.

(10) Patent No.: US 12,326,578 B2
(45) Date of Patent: Jun. 10, 2025

(54) SUB-MM FLAT LENS FABRICATION (71) Applicant: Agency for Science, Technology and Research, Singapore (SG)

(72) Inventors: Jinghua Teng, Singapore (SG); Xin Cai Wang, Singapore (SG); Xiaosong Eric Tang, Singapore (SG); Guang Hui Paul Lim, Singapore (SG); Jie Deng, Singapore (SG); Kai Dong Ye, Singapore (SG); Soo Seng Norman Ang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 511 days.

(21) Appl. No.: 17/778,388

(22) PCT Filed: Nov. 20, 2020

(86) PCT No.: PCT/SG2020/050679
§ 371 (c)(1),
(2) Date: May 19, 2022

(87) PCT Pub. No.: WO2021/101450
PCT Pub. Date: May 27, 2021

(65) Prior Publication Data
US 2023/0015074 A1 Jan. 19, 2023

(30) Foreign Application Priority Data
Nov. 22, 2019 (SG) .............................. 10201911028R (51) Int. Cl.
G02B 3/00 (2006.01)
B23K 26/364 (2014.01)
(52) U.S. Cl.
CPC .......... *G02B 3/0012* (2013.01); *B23K 26/364* (2015.10)

(58) Field of Classification Search
CPC .. G02B 3/0012; G02B 3/0018; G02B 3/0025; G02B 3/0031; B23K 26/364
(Continued)

(56) References Cited

U.S. PATENT DOCUMENTS 7,838,331 B2 11/2010 Komura et al.
7,906,410 B2 3/2011 Arita et al.
(Continued)

FOREIGN PATENT DOCUMENTS

CN 106932916 A 7/2017
CN 109040531 A 12/2018
(Continued)

OTHER PUBLICATIONS

International Search Report for International Application No. PCT/SG2020/050679 dated Jan. 26, 2021, pp. 1-4.
(Continued)

*Primary Examiner* — Jia X Pan
(74) *Attorney, Agent, or Firm* — Shackelford, Mckinley & Norton, LLP (57) ABSTRACT

A method of fabricating an optical lens disclosed herein includes forming a layer of a flat lens structure on a front surface of a substrate, depositing a protective metal layer on the layer of the flat lens structure and on a back surface of the substrate, wherein the protective layer includes chromium, gold, titanium, or nickel, wherein the back surface is located opposite to and away from the front surface having the layer of the flat lens structure, irradiating the protective metal layer at the front surface with a laser to form a channel (i) through the protective metal layer, (ii) through the layer of the flat lens structure and (iii) in the substrate, removing the protective metal layer at the front surface and the back surface of the substrate, and separating the layer of the flat lens structure from the substrate to obtain the optical lens, (Continued)

wherein the channel has a depth defined by a thickness of the substrate remaining at the channel after irradiating the protective metal layer at the front surface with the laser. The optical lens fabricated from the method is also disclosed herein.

20 Claims, 7 Drawing Sheets

(58) Field of Classification Search
USPC .......................................................... 359/619
See application file for complete search history.

(56) References Cited

U.S. PATENT DOCUMENTS

| | | | |
|---|---|---|---|
| 2012/0115308 A1 | 5/2012 | Hua et al. | |
| 2014/0092718 A1* | 4/2014 | Kumar | B82Y 30/00 |
| | | | 369/100 |
| 2019/0025463 A1* | 1/2019 | She | G02B 27/4211 |
| 2019/0137665 A1* | 5/2019 | You | G03B 21/2033 |
| 2019/0224784 A1 | 7/2019 | Fujiwara et al. | |

FOREIGN PATENT DOCUMENTS

| | | |
|---|---|---|
| JP | 2011068542 A | 4/2011 |
| SG | 10201906120 T | 1/2020 |
| WO | 03036712 A1 | 5/2003 |

OTHER PUBLICATIONS

Written Opinion of the International Searching Authority for International Application No. PCT/SG2020/050679 dated Jan. 26, 2021, pp. 1-6.

Wikipedia, "Laser Cutting," https://web.archive.org/web/20190618055621/https://en.wikipedia.org/wiki/Laser_cutting, Jun. 14, 2019, pp. 1-7.

* cited by examiner

SUB-MM FLAT LENS FABRICATION

CROSS-REFERENCE TO RELATED APPLICATION

This application claims the benefit of priority of Singapore Patent Application No. 10201911028R, filed 22 Nov. 2019, the content of it being hereby incorporated by reference in its entirety for all purposes.

TECHNICAL FIELD

The present disclosure relates to a method of fabricating an optical lens. The present disclosure also relates to the optical lens. The method of the present disclosure includes use of a protective metal layer, laser ablation, and semiconductor nanofabrication techniques.

BACKGROUND

Miniature optical lenses may be widely used in compact optoelectronic modules of consumer products. The lenses are typically fabricated by injection molding using a polymer material, which renders an issue of birefringence due to the polymer material and injection molding process. Birefringence refers to an optical property of a material having a refractive index that depends on the polarization and propagation direction of light. In other words, birefringence material has multiple refractive indices instead of one refractive index.

In addition, such polymer based lens is not desirably operable in certain scenarios, such as with higher power laser, in ultraviolet (UV) wavelength range or in mid-far-infrared (IR) wavelength range.

For the above reasons, inorganic materials such as glass based lens may be preferred. For normal glass based optical lens, mechanical grinding and polishing tend to be employed for their fabrication. However, when the lens size becomes small, e.g. smaller than millimetre (mm), challenges arise in the manufacturing process to manipulate and align the lens center with an acceptable level of precision.

The recently emerging flat optics technology makes use of semiconductor processes to fabricate small sized (e.g. in the sub-mm range) optical lens, or a plurality thereof, on a flat substrate. The individual sub-mm lens, or even a lens array, may be then diced out from the substrate.

Traditionally, mechanical dicing is a chip separation method used in semiconductor wafer fabrication. This method may be well established for silicon (Si) wafers but not for glass substrate which the flat lenses are fabricated on. The flat lenses are typically made in a circular shape to save space, and require clean and scratch-free surfaces at both the front and back sides of the glass substrate. The mechanical dicing tends not to work well for sub-mm diameter size and circular shape flat lens cutting.

Another semiconductor method is a combination of plasma etching and laser dicing. Laser dicing may provide more control on the position and size, and has been used for small structure cutting. However, there tends to be issues related to surface protection from particles generated during laser cutting and the handling of sub-mm sized devices. Industry may have adopted the combination of plasma etching and laser dicing to minimize particle contamination, but this does not work for flat lens fabrication due to the different glass or quartz substrate used compared to Si substrates used in semiconductor (e.g. integrated-circuit) fabrication. The demanding requirement for both surfaces of a flat lens to be "super-clean" (a very high degree of cleanliness) also renders plasma etching an unsuitable process.

Moreover, since certain applications require a single-functional lens in a compact package, the separation of a lens from an array of lenses, and from the substrate, have to be carefully carried out.

There is thus a need to provide for a solution that addresses one or more of the limitations mentioned above. The solution should at least provide for a method able to accommodate laser dicing of a flat lens, including sub-mm flat lens, from the glass or quartz substrate and is compatible with semiconductor nanofabrication processes.

SUMMARY

In a first aspect, there is provided for a method of fabricating an optical lens, the method comprising:
  forming a layer of a flat lens structure on a front surface of a substrate;
  depositing a protective metal layer on the layer of the flat lens structure and on a back surface of the substrate,
    wherein the protective layer comprises chromium, gold, titanium, or nickel,
    wherein the back surface is located opposite to and away from the front surface having the layer of the flat lens structure;
  irradiating the protective metal layer with a laser to form a channel (i) through the protective metal layer, (ii) through the layer of the flat lens structure and (iii) in the substrate;
  removing the protective metal layer at the front surface and the back surface of the substrate; and
  separating the layer of the flat lens structure from the substrate to obtain the optical lens, wherein the channel has a depth defined by a thickness of the substrate remaining at the channel after irradiating the protective metal layer with the laser.

In another aspect, there is provided an optical lens fabricated from the method described in various embodiments of the first aspect,
  wherein the optical lens comprises a layer of a flat lens structure and a plurality of nanostructures that extend away from a surface of the flat lens structure,
  wherein the layer of the flat lens structure comprises an optical material, wherein the optical material comprises $TiO_2$, $Si_3N_4$, GaN, AlN, GaP, GaAlN, GaAlP, Si, or Ge and
  wherein the nanostructures comprise a material comprising $TiO_2$, $Si_3N_4$, GaAlN, GaAlP, GaAlN, GaAlP, Si, or Ge.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 5A shows the shapes of the tornado nozzle used in certain examples of the present method. Specifically, FIG. 5A shows a top-down view of the tornado nozzle used during partial laser dicing.

FIG. 5B shows the shapes of the tornado nozzle used in certain examples of the present method. Specifically, FIG. 5B shows a bottom-up view of the tornado nozzle used during partial laser dicing.

FIG. 5C shows the shapes of the tornado nozzle used in certain examples of the present method. Specifically, FIG. 5C shows a cross section view of the tornado nozzle used during partial laser dicing.

FIG. 6A is an optical photo for comparing the particle reduction effects by using the specially designed tornado nozzle. With a normal nozzle, some large particles were observed accumulating on the front surface of the substrate as shown in FIG. 6A. Scale bar denotes 100 μm.

FIG. 6B is an optical photo for comparing the particle reduction effects by using the specially designed tornado nozzle. With a normal nozzle, some large particles were observed accumulating on the backside (back surface) of the substrate as shown in FIG. 6B.

FIG. 6C is an optical photo for comparing the particle reduction effects by using the specially designed tornado nozzle. By using the specially designed tornado nozzle during laser dicing, only a small amount of particles distributed and can be easily cleaned in the next step. FIG. 6C shows the front surface of the substrate based on the tornado nozzle. Scale bar denotes 200 μm.

FIG. 6D is an optical photo for comparing the particle reduction effects by using the specially designed tornado nozzle. By using the specially designed tornado nozzle during laser dicing, only a small amount of particles distributed and can be easily cleaned in the next step. FIG. 6D shows the back surface of the substrate based on the tornado nozzle. Scale bar denotes 200 μm.

FIG. 7A is an optical photo showing the ultrasonic cleaning effects after cleaning the dicing plate. FIG. 7A shows the backside of a sub-mm lens, wherein large particles are not present as the particles are removed after cleaning. Scale bar denotes 100 μm.

FIG. 7B is an optical photo showing the ultrasonic cleaning effects after cleaning the dicing plate. FIG. 7B shows the front side of a quartz substrate after dicing without lens, wherein large particles are not present as the particles are removed after cleaning. Scale bar denotes 100 μm.

FIG. 7C is an optical photo showing the ultrasonic cleaning effects after cleaning the dicing plate. FIG. 7C shows the front side of a sub-mm lens, wherein particles are not present as the particles are removed after cleaning. Scale bar denotes 100 μm.

DETAILED DESCRIPTION

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method of fabricating an optical lens. The present method is advantageous for fabricating small sized lens, e.g. lens having diameters or dimensions in the sub-mm range, as the present method allows for precise control of the lens parameters. Moreover, large number of small flat lenses can be fabricated with one substrate and large volume mass production is possible. The expression "sub-mm" herein refers to less than 2 mm or less than 1 mm.

The present method involves forming a flat lens structure and laser dicing to fabricate the optical lens. The flat lens structures can be formed on a substrate that is not a semiconducting material or can be absent of a semiconducting material. Examples of the substrate can include but is not limited to glass, quartz, sapphire, and magnesium fluoride. The optical lens fabricated from the flat lens structure can be a sub-mm lens. The term "flat lens structure" herein refers to a planar structure that forms the optical lens, wherein "flat" signifies that an optical material for forming the lens, or a part thereof, may be deposited on the substrate to form a layer, the layer being a planar layer. The term "laser dicing" herein is used exchangeably with "laser ablation" and "laser cutting", which refers to use of laser to remove part of a material.

The present method involves a step of forming at least one protective metal layer on the substrate. The at least one protective metal layer may be deposited over the flat lens structure to cover it entirely. The protective metal layer is also termed herein "protection metal layer", and for brevity "protection layer". Advantageously, the protective metal layer can be deposited on the front and back surfaces of the substrate. The front surface of substrate refers to the surface where the flat lens structure is formed. The back surface of substrate refers to the surface of the substrate which is opposite to and away from the front surface having the flat lens structure formed. The front surface and back surface are herein exchangeably referred to as front side and backside.

The present method deposits the protective metal layer at both surfaces of the substrate to protect the optical lens from (i) any damage during its fabrication and (ii) and any particles that may adhere to the surfaces. Such particles tend to be generated from and/or during the laser dicing step. A resultant optical lens having particles stuck thereon may suffer from not being able to transmit light entirely or light passing through the optical lens gets undesirably dissipated and/or absorbed when it encounters one of the particles, and hence lost. Said differently, the protective metal layer protects the cleanliness of the flat lens structure and hence the cleanliness of the resultant optical lens.

The metal protection layer also helps to dissipate heat generated from laser dicing. The metal protection layer has much higher heat conductivity than the substrate, e.g. quartz, which helps to effectively dissipate excessive heat generated during the laser cutting process so as to reduce the heat affected zone and improve cutting quality. Also, due to its higher absorption of the laser beam, the metal protection layer is significantly effective in enhancing the ablation rate of the laser cutting process which improves the cutting efficiency. Without the metal protection layer, more passes of the laser tend to be required (~80 passes) to cut through the substrate, e.g. quartz. For example, even with a 400 nm thick metal protection layer, a reduced number of passes (e.g. ~36 passes) can be used to cut through the quartz.

The protection layer can be easily removed after laser dicing by a chemical solution without compromising the flat lens structure that eventually forms the optical lens or a part of the optical lens.

The present method may involve use of a specifically designed apparatus for laser ablation. The apparatus may be configured with one or more nozzles that reduce the particles generated during laser dicing and improves the sidewall cutting profile. The one or more nozzles may be configured as a tornado nozzle.

The present method is advantageously versatile as the laser dicing can be alternatively and/or additionally carried out at the backside of the substrate, which is the surface of substrate without the flat lens structure formed thereon. This further mitigates and/or alleviates the particles issue and may maximize the effective flat lens size. A marker or dicing channel can be fabricated using, e.g. photoresist, before the metal deposition which is a process of coating the metal protection layer.

In the present method, the laser dicing does not cut through the substrate entirely. For example, for laser dicing the front surface, the laser dicing may cut (i) through the protective metal layer, (ii) through the flat lens structure and (iii) partially through the substrate, leaving behind a thin layer of the substrate untouched. The sub-mm lens shaped from this cutting can then be easily separated (i.e. detached, disassembled, or even released) from the substrate after removing the protection layers, by any gentle agitation forces or ultrasonic agitation (i.e. ultrasonication), without any damage. Where the sub-mm lens is released from the substrate, this means that the flat lens structure forming the optical lens is self-released (spontaneously released) without any intervention to physically separate the flat lens structure from the substrate, such as by a user's hand or robotic arms.

Advantageously, the present method enables various shapes of lens to be fabricated from the laser dicing, such as circular shape optical lens, or any regular or irregular shapes.

As the present method is able to integrate laser dicing with semiconductor nanofabrication techniques (e.g. plasma etching, sputtering, photolithography, electronic beam evaporation), the present method is also termed herein an "integrated method".

Details of various embodiments of the present method and optical lens, and advantages associated with the various embodiments are now described below.

In the present disclosure, there is provided a method of fabricating an optical lens according to various embodiments of the first aspect. The optical lens can be a sub-mm optical lens. In other words, the optical lens may have a diameter that is less than 2 mm, or less than 1 mm, etc. The term "diameter" herein refers to the maximal length of a line segment passing through the centre and connecting two points on the periphery of an object. The object may be circular or not a perfect circle.

The present method includes forming a layer of a flat lens structure on a front surface of a substrate. The flat lens structure is formed as a planar structure on the substrate and therefore referred to as a layer of a flat lens structure. For brevity, the layer of flat lens structure may be referred herein as "flat lens structure".

The present method includes depositing a protective metal layer on the layer of the flat lens structure and on a back surface of the substrate. Advantages of the protective metal layer is already described above. The protective metal layer may include chromium, gold, titanium, or nickel. Other metals that protects the lens from particles and dissipate heat may be used. The protective metal layer, such as chromium (Cr) or other suitable metals, coated on both the front side with flat lens structure and the backside of the substrate protect the flat lens structure (and hence the resultant optical lens) from any damage and particles sticking to the surface during the laser dicing process. Any particles falling on any side of the optical lens or substrate may undesirably scatter light and thus spoil the lens. The metal protective layer also helps dissipate heat generated in laser dicing, wherein the metal protective layer improves the heat spreading in the laser dicing process, which takes a long time especially when a transparent glass or quartz substrate is used. The better heat dissipation produces a better edge profile for the lens. Comparatively, in semiconductor dicing, e.g. dicing of a silicon substrate, it is much easier and takes much shorter time since shallower cutting tends to be required. The protective metal layer in this instance is not used to provide (i.e. is absent of) any adhesion functionalities. The back surface is located opposite to and away from the front surface having the layer of the flat lens structure.

The present method includes irradiating the protective metal layer at the front surface with a laser to form a channel (i) through the protective metal layer, (ii) through the layer of the flat lens structure and (iii) in the substrate. This leaves behind a thickness of substrate that renders ease of subsequently separating the flat lens structure from the substrate by gentle agitation means. The term "channel" may also be known herein as "street" or "dicing street", as the channel appears to form a street on a laser-diced layer, for example, from the top-down view.

The present method includes removing the protective metal layer at the front surface and the back surface of the substrate, and separating the layer of the flat lens structure from the substrate to obtain the optical lens.

In various embodiments of the present method, the channel may have a depth defined by a thickness of the substrate remaining at the channel after irradiating the protective metal layer at the front surface with the laser. The thickness of the substrate remaining at the channel may range from 50 μm to 100 μm, 60 μm to 100 μm, 70 μm to 100 μm, 80 μm to 100 μm, 90 μm to 100 μm, 50 μm to 60 μm, 50 μm to 70 μm, 50 μm to 80 μm, 50 μm to 90 μm, etc. As mentioned earlier, this thickness of the partially laser-diced substrate provides for the flat lens structure to be separated from the substrate by gentle agitation means. The thickness of the remaining substrate may have to be controlled well. This is because a remaining substrate that is too thin may render the flat lens structure easily breaking off during any cleaning steps. Conversely, too thick renders the release difficult and may require harsher separation means that easily damages the lens, especially the edge of the lens.

Various embodiments of the present method may further include cleaning (i) the protective metal layer, (ii) the layer of the flat lens structure and (iii) the substrate after irradiating the protective metal layer with the laser and prior to removing the protective metal layer. The cleaning may include subjecting (i) the protective metal layer, (ii) the layer of the flat lens structure and (iii) the substrate to ultrasonication at a power operable to clean (i) the protective metal layer, (ii) the layer of the flat lens structure and (iii) the substrate. Ultrasonication is a technique usable in semiconductor manufacturing. In these embodiments, the power of the ultrasonication for cleaning does not damage (i) the protective metal layer, (ii) the layer of the flat lens structure and (iii) the substrate. The power of the ultrasonication for cleaning does not render detachment of the protective metal layer from the flat lens structure and/or the substrate. The power of the ultrasonication for cleaning also does not render detachment of both the protective metal layer and flat lens structure from the substrate.

The ultrasonic cleaning can be carefully controlled since the flat lens structure and its connections to the substrate may be delicate and fragile. A short period of gentle ultasonication cleaning can be used to remove particles, and a longer period of ultrasonic cleaning can be used to break-off the connection and release the flat lens structure from the substrate.

Various embodiments of forming the layer of the flat lens structure may include depositing an optical material on the substrate, wherein the optical material comprises $TiO_2$, $Si_xN_y$, GaN, AlN, GaP, GaAlN, GaAlP, Si, or Ge, wherein x can be 3 and y can be 4. In other words, the flat lens structure (and hence the optical lens or a part thereof) is formed of such an optical material. These materials can be used to fabricate optical lens operable with different wavelength ranges. The flat lens can be constructed from such optical materials as these optical materials may be transparent in the wavelength of interests. For example, $TiO_2$, SiN, GaN, AlN, GaP, etc. are transparent to the visible light range. In certain examples, silicon, amorphous silicon (a-Si), etc. are transparent to the near infrared (IR) and mid-IR range. The term "transparent" herein refers to a material that allows one or more types of radiation from the electromagnetic spectrum to pass through entirely or substantially (e.g. more than 99%, more than 95%, more than 90%).

Various embodiments of the present method may further include patterning the layer of the flat lens structure to form nanostructures from the layer of the flat lens structure. The nanostructures may include a material having a higher refractive index than the substrate. Such material may include $TiO_2$, $Si_xN_y$, GaAlN, GaAlP, GaAlN, GaAlP, Si, or Ge, wherein x can be 3 and y can be 4. These materials can be used to fabricate optical lens operable with different wavelength ranges. The substrate may include glass, quartz, sapphire, or magnesium fluoride. Advantages of forming such nanostructure on the flat lens structure (and hence the resultant optical lens) is discussed in the examples section further below. Materials of the nanostructures and the flat lens structure can be the same or different, preferably different.

As the substrate used may be transparent, the present method may further include depositing a layer of photoresist on the back surface of the substrate, and forming one or more channels in the photoresist through, for example, photolithography, wherein the one or more channels serve as a marker or guide for the laser dicing. This allows for marking of where the laser can cut, e.g. the protective metal layer, the layer of flat lens structure and the substrate, to define a diameter of the resultant optical lens, especially when all of the materials used are transparent to the human eye. In semiconductor fabrication, the channels from dicing tends to be formed at the front side of the substrate and the lithography used provides alignment from the front side of the substrate. If this is employed in the present method, particles from the photoresist deposited at the front side of the substrate may stain the flat lens structure and/or dicing of the substrate adversely renders generated particles to penetrate the photoresist such that the particles that penetrate the photoresist may stick to the flat lens structure. In the present method, a metal protective layer formed underneath a photoresist can suppress the particles or even stop the generation of particles effectively. Accordingly, the present backside alignment approach, dicing channel formed at backside away from the lens, and presence of the protection metal layer, aids in preserving cleanliness of the resultant optical lens. Other advantages of this step is either described above or in the examples section further below. The photoresist may be removed eventually by any suitable means that does not compromise the optical property of the optical lens. The photoresist may be removed after the irradiating step (i.e. laser dicing step).

Various embodiments of depositing the protective metal layer may include depositing the protective metal layer on the front surface and the back surface by, for example, electronic beam evaporation or sputtering. Electronic beam evaporation and sputtering may be common methods used in depositing of a metal. Depositing the protective metal layer may include, in various embodiments, depositing the protective metal layer to have a thickness ranging from 80 nm to 400 nm, 100 nm to 400 nm, 150 nm to 400 nm, 200 nm to 400 nm, 250 nm to 400 nm, 300 nm to 400 nm, 350 nm to 400 nm, etc. A protective metal layer too thin may not provide sufficient protection from particles and dissipate heat effectively. A protective metal layer that is too thick may render a long metal deposition time.

Various embodiments of irradiating the protective metal layer with the laser, such as at the front surface, include irradiating the protective metal layer (e.g. at the front surface) with a single-beam laser. Irradiating the protective metal layer (e.g. at the front surface) with the laser may include aligning the laser to the flat lens structure to derive a diameter of the optical lens. The alignment can also be taken from the pattern defined by the photoresist deposited at the back surface of the substrate.

In various embodiments, the diameter of the optical lens may be less than 2 mm, less than 1 mm, less than 0.9 mm, less than 0.8 mm, less than 0.7 mm, less than 0.6 mm, less than 0.5 mm, less than 0.4 mm, less than 0.3 mm, less than 0.2 mm, less than 0.1 mm, etc. The present method is able to fabricate such sizes of optical lens with an acceptably high level of precision without any errors in the dimension or misalignment that susceptibly arises in traditional techniques that require reference to center of a lens. The optical parameters of the optical lens are also not compromised.

In various embodiments of the present method, the laser may be a pulsed layer having a pulse duration of 10 picoseconds or less, and/or a pulse energy ranging from 100 μJ to 200 μJ. Advantageously, such a laser can help to reduce laser cutting loops needed to form the channel, spread heat from laser pulse, prevent the sticking of particles generated to lens surfaces. The protection metal layer can be easily and completely removed after laser dicing.

Figure 5A:
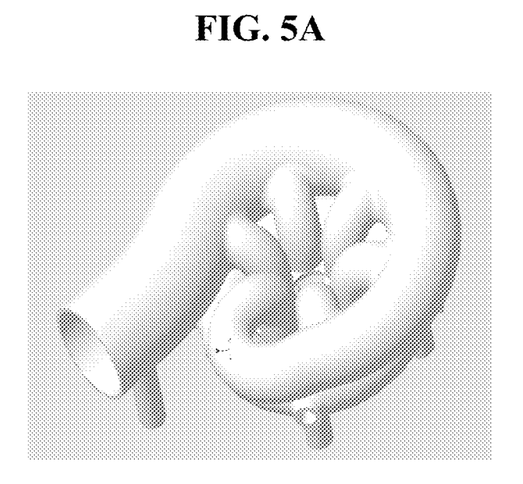
Figure 5B:
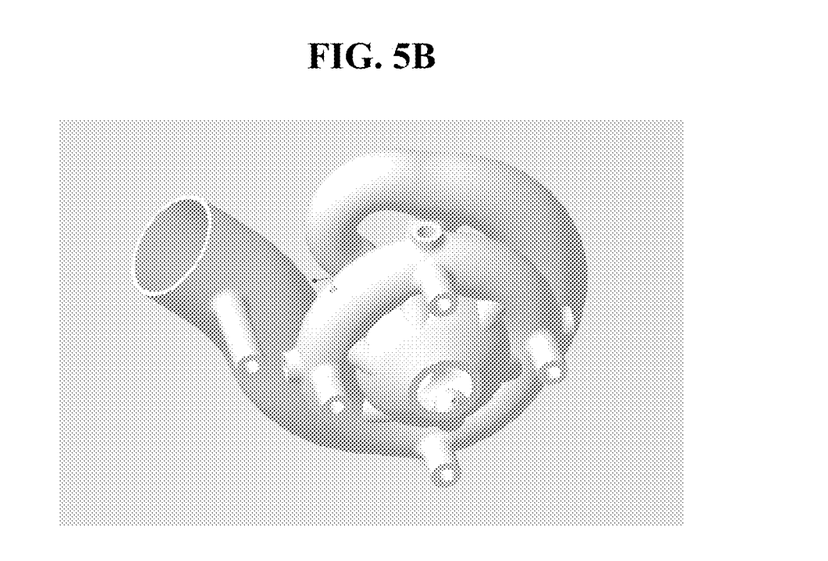
Figure 5C:
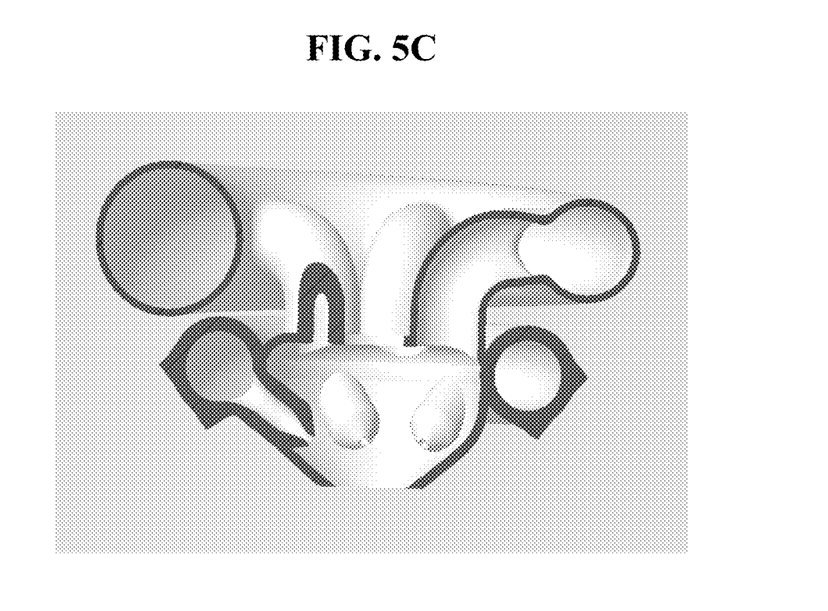
Figure 6:
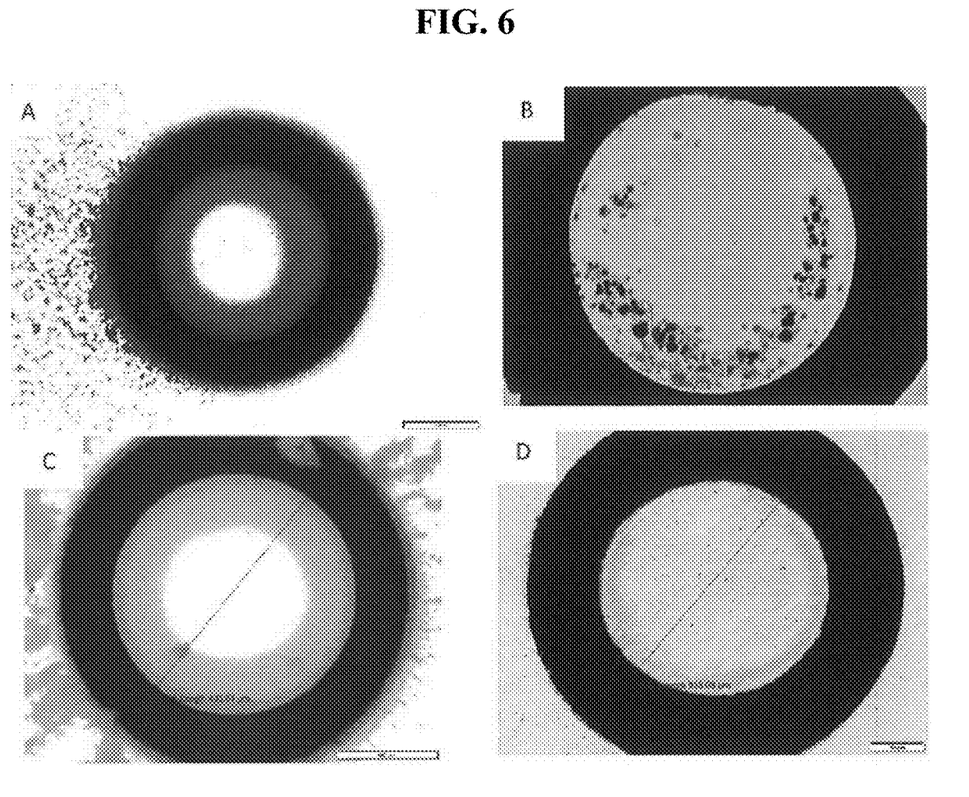

In various embodiments, irradiating the protective metal layer (e.g. at the front surface) with a laser (e.g. a beam) may include passing the laser (e.g. a beam) through an apparatus having one or more nozzles configured in a manner which minimizes generation of particles from (i) the protective metal layer, (ii) the layer of the flat lens structure and (iii) the substrate. This may include passing the laser (e.g. a beam) through an apparatus having one or more nozzles configured to blow one or more gases toward the protective metal layer, and concurrently, remove particles and debris by vacuum. The apparatus may be configured with one or more nozzles as shown in any one of FIG. 5A to 5C to remove the particles and debris by vacuum concurrently with the laser dicing in operation. Such a nozzle configuration may be termed herein a "tornado nozzle". The concurrent operation of laser dicing and removing particles and debris may be instrumental to avoid any ejected debris from damaging (e.g. scratching) the surface (e.g. flat lens structure). At the same time, the configuration of the one or more nozzles as depicted in any one of FIG. 5A to 5C provides for flow characteristics instrumental to having a good edge quality (e.g. free of particles and debris without damage). The apparatus may be a containment device for laser ablation, wherein the apparatus may be configured to channel the laser to a single spot for laser dicing, which minimizes generation of particles compared to a laser that is not focused and hence hits a wide area of surface that results in more particles generated.

In the present method, removing the protective metal layer may include chemically etching away the protective metal layer. Chemical etching has better selectivity to the protective metal layer compared to, for example, plasma etching.

In various embodiments of the present method, separating the layer of the flat lens structure from the substrate may include subjecting the flat lens structure and the substrate to ultrasonication at power operable to have the flat lens structure detach from the substrate. Ultrasonication is a technique usable in semiconductor manufacturing. In these embodiments, the power of the ultrasonication does not damage the layer of the flat lens structure and the substrate. A power of the ultrasonication that fulfils the requirements of this step may be used.

The ultrasonic process for this separation differs from ultrasonic process commonly used in semiconductor processes to remove coating materials. The separation of the flat lens structure, especially in the sub-mm range, is not straightforward and this separation step via such ultrasonication may be required specifically for the laser-diced small sub-mm optical lens. The ultrasonic cleaning can be carefully controlled since the flat lens structure and its connections to the substrate may be delicate and fragile. A short period of gentle ultasonication cleaning can be used to remove particles, and a longer period of ultrasonic cleaning can be used to break-off the connection and release the flat lens structure from the substrate.

In various embodiments, the nanostructures may extend away from the front surface. The nanostructures may be or may include nanopillars, nanodisks, and/or nanobars.

The present disclosure also provide for an optical lens fabricated described according to various embodiments of the method of the first aspect. Embodiments and advantages described for the method of the first aspect can be analogously valid for the present optical lens subsequently described herein, and vice versa. As the various embodiments and advantages have already been described above and examples demonstrated herein, they shall not be iterated for brevity.

For example, the optical lens may include a layer of a flat lens structure and a plurality of nanostructures that extend away from a surface of the flat lens structure. The layer of the flat lens structure may include an optical material, wherein the optical material may include $TiO_2$, $Si_xN_y$, GaN, AlN, GaP, GaAlN, GaAlP, Si, or Ge. The nanostructures may include a material that includes $TiO_2$, $Si_xN_y$, GaAlN, GaAlP, GaAlN, GaAlP, Si, or Ge. x may be 3 and y may be 4 in certain embodiments of $Si_xN_y$.

In various embodiments, the optical lens may have a diameter less than 2 mm or less than 1 mm, etc.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the punctuation "~", the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure provides a technique to fabricate one or more optical lenses, including sub-mm sized lens (e.g. optical lens) involving the flat lens structure and a laser dicing step, wherein inorganic materials are specifically used. That is, all materials that form the lens are inorganic in nature. The laser dicing step may be used to create sub-mm lens having a flat lens structure.

In the present disclosure, fabrication of sub-mm sized optical lens are used as one non-limiting example for demonstrating the present method, and is not meant to limit the present disclosure to fabrication of sub-mm sized optical lens. In other words, the present method is applicable for fabricating other sizes of optical lens.

Generally, as a first step, a flat lens structure is fabricated on a glass substrate through micro-nano-fabrication. The flat lens, or plurality of flat lens can be cut from the glass substrate by laser dicing. The plurality of flat lens may be an array of flat lens formed on the substrate.

In the laser dicing step, the flat lens and glass substrate are covered by a protective layer (e.g. chromium, gold, titanium, or nickel) to protect the two surfaces from damage and any particles generated during the laser dicing. The laser dicing cuts the glass substrate till a thin layer remains, e.g. 50 μm-100 μm.

The protection layer is removed by chemical solution to attain a clean front and back surfaces. The individual lens can then be separated and detached from the glass substrate by ultrasonic agitation or other gentle forces.

The present method and lens are described in further details, by way of non-limiting examples, as set forth below.

Example 1

General Description of Present Method

Figure 8:
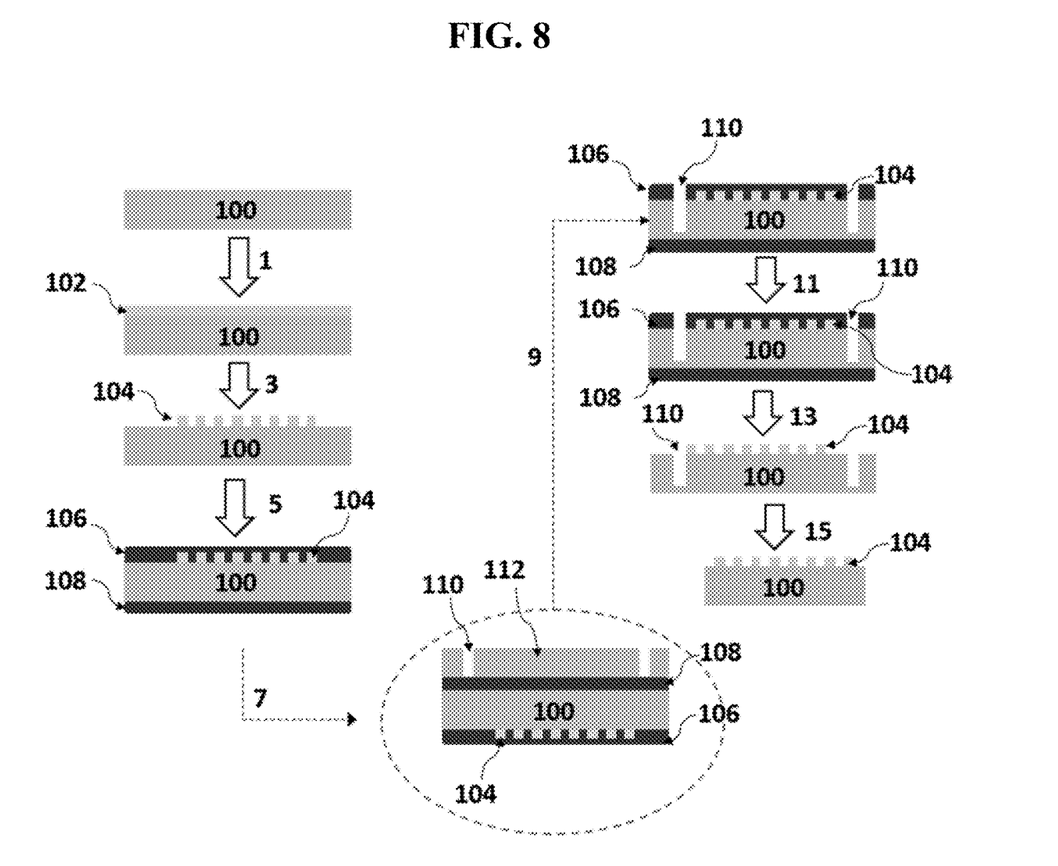
FIG. 8 depicts a schematic flow chart that illustrates a batch fabrication of sub-mm lens based on the method of the present disclosure.

FIG. 8 depicts a schematic diagram of the present method.

First, a substrate 100 is provided. The substrate 100 can be a quartz or glass substrate. Other materials such as sapphire or transparent to the wavelength of the light of interest can be used.

Step 1 is carried out to grow a layer of the flat lens structure 102 on the substrate 100. The layer of flat lens structure 102 can be grown from a material such as silicon (Si) or amorphous silicon (a-Si). For brevity, the layer of flat lens structure 102 is termed herein "flat lens structure". Other materials suitable for fabricating an optical lens can be used, which include and are not limited to, $TiO_2$, $Si_xN_y$, GaN, AlN, and/or GaP, GaAlN, GaAlP, etc. In certain examples, the $Si_xN_y$ used can be $Si_3N_4$, which means x can be 3 and y can be 4.

Patterning 3 of the flat lens structure 102 is then carried out to fabricate nanostructures 104 on the flat lens structure 102. In other words, the nanostructures 104 are formed on a thin layer of the flat lens structure 102. The patterning can be carried out by any semiconductor nanofabrication techniques, such as lithography and etching.

Deposition 5 of a protective/protection layer 106, 108 (e.g. a metal protective layer) is carried out on both sides (i.e. both front and back surfaces of substrate 100). The backside or back surface is defined as the side or surface of the substrate 100 that is opposite to and away from the surface of where the flat lens structure 102 is formed. In other words, the front side or front surface refers to the side or surface where flat lens structure 102 is formed. The metal used for forming the protective/protection layer can be chromium. The thickness of this layer can range from 80 nm to 400 nm. Deposition of the protective layer can be carried out via electronic beam (e-beam) evaporation and/or sputtering on both sides of the substrate.

Optionally, step 7 may be carried out. Step 7 can be a lithography step to pattern a photoresist 112 for one or more dicing channels 110 to be formed on the backside of the substrate 100. The laser dicing at the backside of the substrate 100 is described in more details in one of the examples below.

If step 7 is not carried out, the method may involve directly or proceed directly to step 9 wherein laser dicing is carried out to form the sub-mm optical lens structure. That is to say, the laser dicing can be used to cut a circular shape (from top-down view) to derive the optical lens.

Step 11 is a cleaning step which is then carried out, wherein low power ultrasonic cleaning can be used to remove any particles generated from the laser dicing in steps 7 and/or 9.

Step 13 is a step of removing the protective layer 106, 108 from both sides of the substrate. The removal of the protective layer 106, 108 can be carried out with use of a chemical. For example, step 13 can be carried out by chemically etching the protective layers 106, 108.

Step 15 is a step of separating the flat lens structure 102 having the nanostructures 104 from the substrate 100 to form the resultant optical lens. The flat lens structure 102 having nanostructures 104 can be disassembled from the substrate 100 using mild-powered ultrasonication as one example. The resultant sub-mm optical lens is not shown in FIG. 8.

Steps 7 and 9 of the present method can be carried out using an apparatus, i.e. a tornado nozzle, which is described in an example further below. The apparatus allows for laser dicing to be integrated into the present method.

Steps 5, 7, 9, 11 and 13 denote the combination of laser dicing with semiconductor nanofabrication techniques.

Steps 9, 11, 13 and 15 denote the effective steps for release and detachment of the optical lens from the substrate.

Example 2

Detailed Description of a Non-Limiting Example of the Present Method

The present non-limiting example demonstrates for the present method described above through fabrication of a 0.5 mm flat lens made of amorphous Si (a-Si) on a quartz (or glass) substrate. Other materials such as $TiO_2$, SiN, GaN, AlN, and/or GaP, are usable for making the lens.

Details describing the other steps, e.g. e-beam metal evaporation, picosecond-based laser scribing and ultrasonic cleaning, their operating conditions and materials used, are included to provide an understanding of the present method.

Figure 1A:
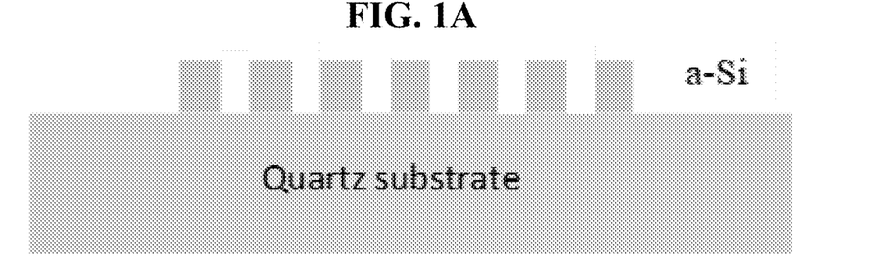
FIG. 1A depicts schematic drawing of a cross section view of a sub-mm flat lens fabricated using a quartz substrate having a layer of amorphous (a-Si) nanopillars. In this example, a sub-mm flat lens includes a plurality of a-Si nanopillars on a quartz substrate.
Figure 1B:
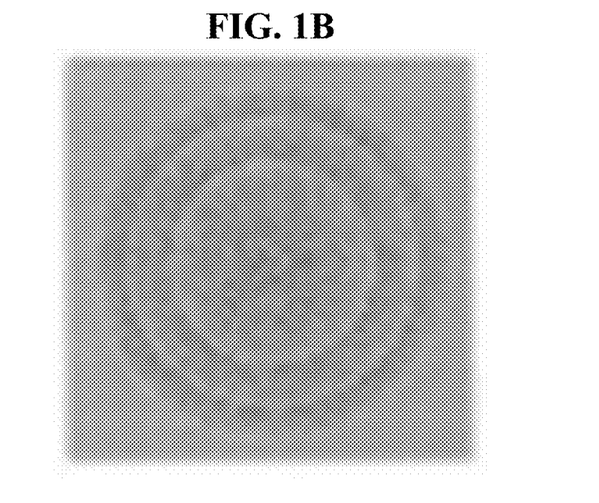
FIG. 1B depicts the top-down view of the schematic drawing of FIG. 1A, illustrating the arrangement of the a-Si nanopillars in the flat lens structure.

FIGS. 1A and 1B show a schematic drawing of the cross section view and top-down view of the a-Si nanopillars fabricated on a quartz substrate and their ring shape arrangement, respectively.

Figure 2A:
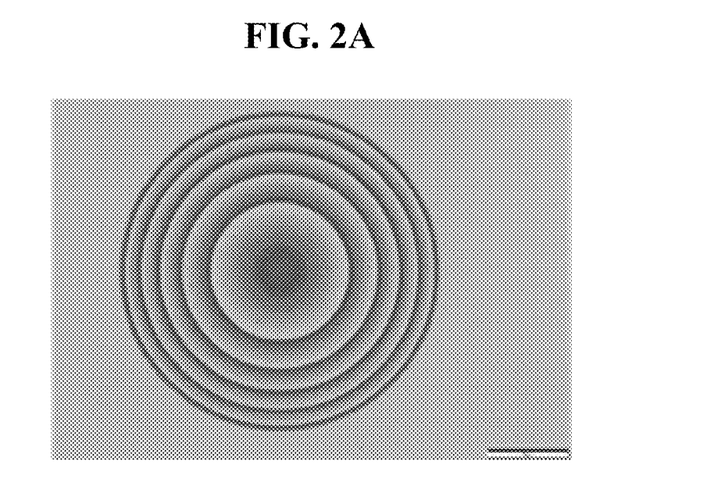
FIG. 2A is an optical photo showing a sub-mm flat lens after the microfabrication. Scale bar denotes 100 μm.
Figure 2B:
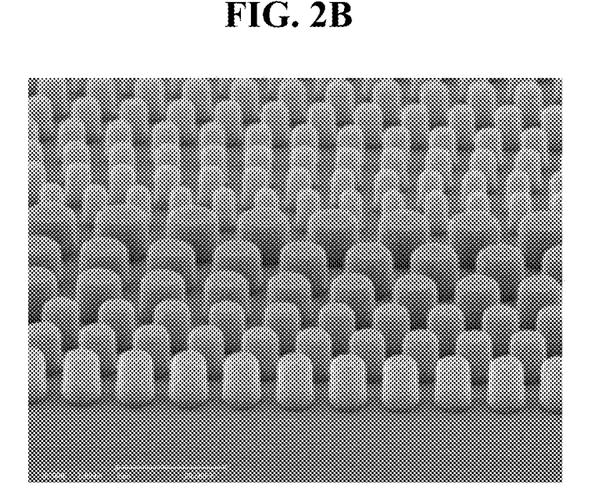
FIG. 2B is a scanning electron microscopy (SEM) image showing a-Si pillars having different dimension fabricated on quartz substrate through semiconductor processing, such as electron beam evaporation and plasma etching. Scale bar denotes 1 μm.

FIG. 2A shows the optical image of a fabricated 0.4 mm diameter flat lens and FIG. 2B shows the scanning electron microscopy (SEM) image of a-Si nanopillars fabricated on the flat lens, wherein the nanopillars can have different dimensions fabricated through electronic beam (e-beam) evaporation and plasma etching. As e-beam lithography and plasma etching are semiconductor techniques understood by one skilled in the art, their specific operation details on nanofabrication processes of the sub-mm flat lens, such as patterning and Si nanopillar etching, are not discussed herein for the sake of brevity of the present disclosure. Nevertheless, in the present disclosure, the e-beam patterning is carried out using an Elionix-ELS-700 machine and a-Si is etched in Oxford 100 ICP etcher using $C_4F_8$ and $SF_6$ gases at pressure of 9 mTorr (~1.2 Pa).

Figure 3A:
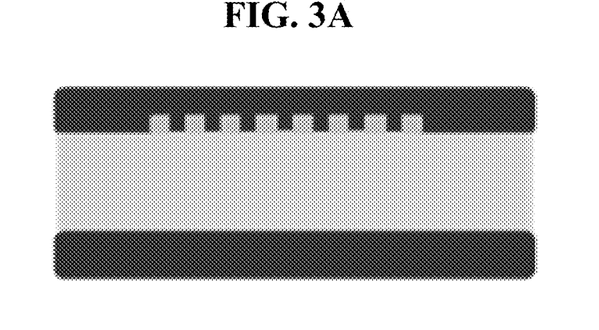
FIG. 3A is a schematic drawing showing metal layers covering both surfaces (front and back) of the quartz substrate and flat lens. The back surface refers to the opposing surface that is away from the array of flat lens.
Figure 3B:
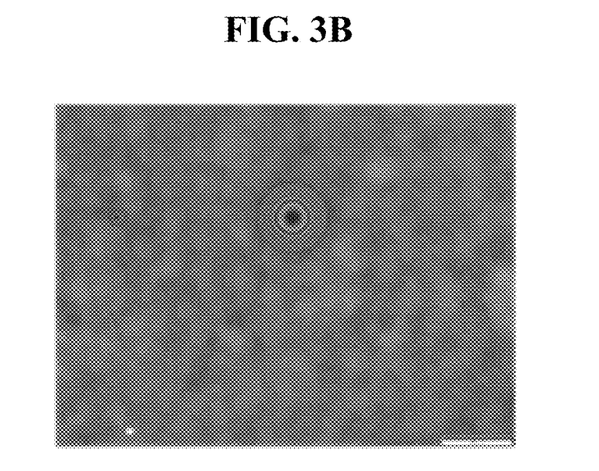
FIG. 3B is an optical photo showing a flat lens and the dark background from the reflection of the metal layer on the other side (i.e. backside) of the quartz substrate. The other side (i.e. backside) of the substrate refers to the opposing side of the substrate that is away from the flat lens. Scale bar denotes 100 μm.

Before proceeding to the laser dicing step, chromium (Cr) metal layers are deposited on both surfaces of the quartz substrate, as shown schematically in FIG. 3A. The metal layer is used to protect the flat lens structure, nanopillar structures and backside (i.e. back surface) of the quartz substrate from particles generated through laser dicing. Since the flat lens, including the nanopillars structures, is an optical device and light is meant to pass through it, both surfaces are required to be clean and scratch-free.

The other advantage of using metal protection is that the metal layer helps to dissipate heat generated during laser dicing and make the cutting more efficient. In the present example, Cr metal is deposited by e-beam evaporation at a deposition rate of 2 Å/s. It can also be deposited by sputtering as long as a clean chamber is maintained. No crack or stress is generated in the Cr layer deposited on both sides of the quartz substrate, even when an entirely distinct substrate material of quartz and/or glass is used. Various steps of the present method also do not induce crack nor stress in the metal protection layer. The thickness of the Cr layer can range from 80 nm to 400 nm.

Figure 4A:
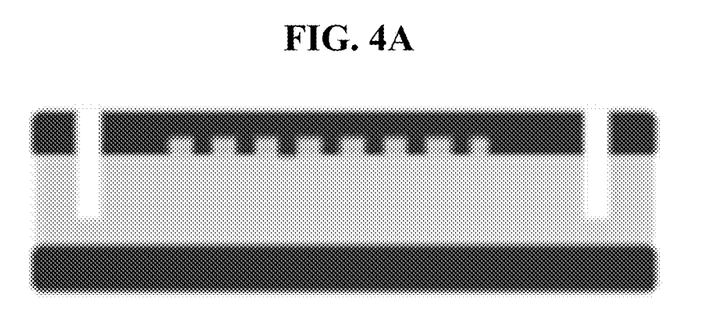
FIG. 4A is a schematic drawing showing the alignment in laser cutting. The cutting is almost through the quartz substrate, leaving a thin layer quartz untouched to keep the flat lens with the substrate.
Figure 4B:
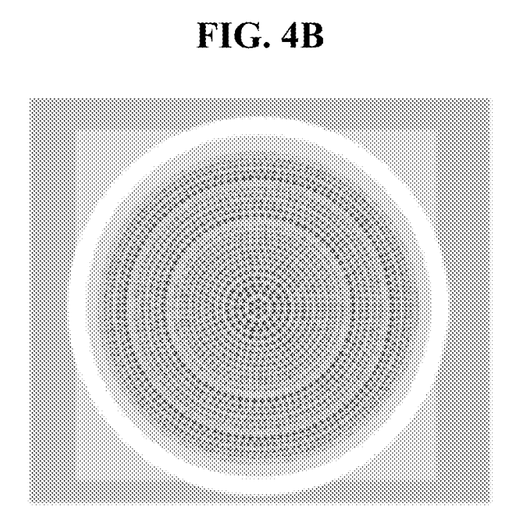
FIG. 4B shows the cutting lines are aligned and circulated around the flat lens.

Ultrafast pulsed lasers emitted ultrashort duration pulses of laser light with time duration in the tens of picoseconds or less. High power ultrafast lasers are very effective in laser cutting processes. Pulsed laser is particularly good for this micromachining application because continuous wave or longer duration pulsed laser create extensive heat affected zones that are unacceptably large for such high precision and small (sub-mm) component size. The beam from this laser is directed by a high speed and high precision mirror galvanometer. The dicing process thus involves the use of this laser to cut a circle around the sub-mm lens until an appropriate depth is reached for separation using ultrasonic treatment. The cutting circle is aligned to fabricate the to sub-mm lens and is shown in FIGS. 4A and 4B. The alignment is done manually with the aid of a vision system of the laser, which is a charged-coupled device (CCD) camera wherein its field of view covers the laser's processing area. A nozzle apparatus specifically used for the laser cutting step of the present method is described in the subsequent example below.

Control over the pulse energy and pulse overlap are variable to be considered for the quality of the laser dicing. Pulse energy, in this case is in the hundred microjoule range, sufficient for ablation of the material while excessive pulse energies can rapidly increase the plasma damage to the edges and to the surface. Also, an optimal window for the pulse overlap exists. A pulse overlap determines the pulse number and total energy received per location on the substrate, from which the material removal rate and also the induced heat effect may be derived. With the setting up of a suitable laser beam scanning speed and laser repetition rate, an optimal window for the pulse overlap exists in terms of cutting efficiency and quality. Once a suitable set of laser cutting parameters is established, design of the cutting path takes place. The ablation rate of the material is strongly related to the surface and the material. Without the metal layer, more passes are required (~80 passes) to cut through the quartz. A thick metal layer proved significantly effective in enhancing the ablation rate of the cutting process. With a 400 nm thick metal layer, about 36 passes are used to cut through the quartz.

Figure 7A:
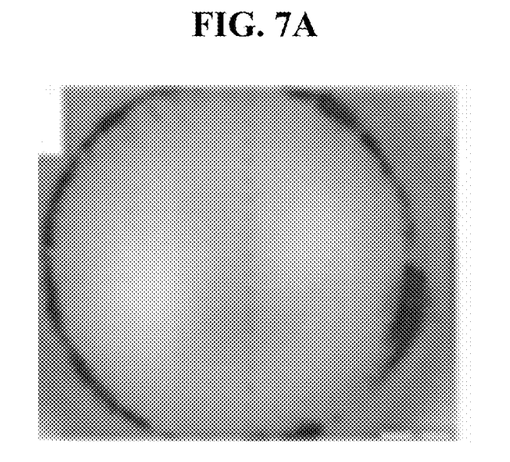
Figure 7B:
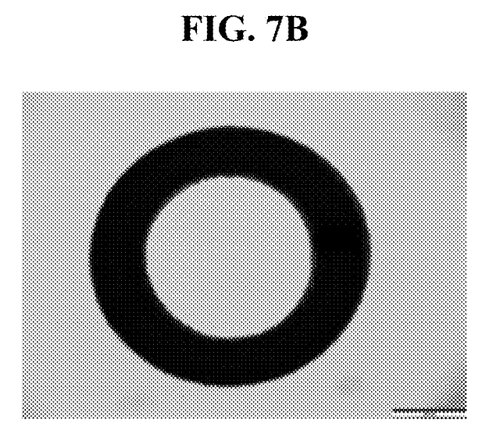
Figure 7C:
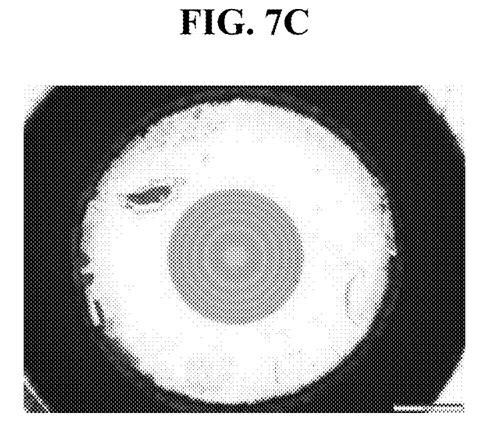
Figure 7D:
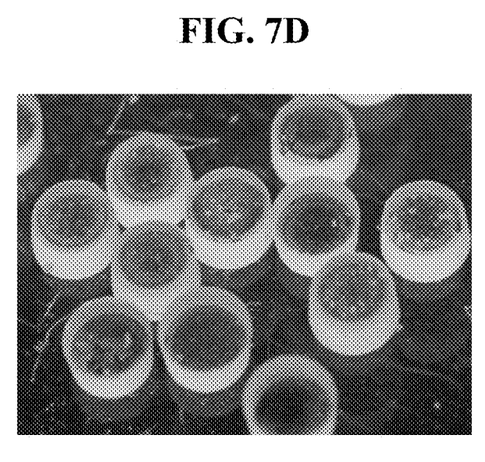
FIG. 7D is a photo showing some cut samples obtained from the substrate just by using very gentle force or ultrasonic agitation.

In the final step, the protection layers are removed by a chemical solution (e.g. chromium etchant where chromium is used as the protection layers) to have the front and back surface cleaned. The lens can then be easily separated and detached from the glass substrate by ultrasonic agitation or other gentle forces. Most of the particles can be removed by acetone via a one-minute (1 min) low power ultrasonic agitation that is followed by isopropyl alcohol (IPA) rinse, as shown in FIG. 7A to 7C. The chemical etching of the protective metal layer, e.g. chromium, can be done after the low power ultrasonic clean and before the mid-power ultrasonic clean. The substrate are then immersed in an IPA solution, and a stronger ultrasonic agitation or a long-duration low power agitation can be used to break off the lens. Cracks/stress in the protective metal layer (e.g. chromium layer) may be avoided as it may adversely affect the side wall of the lens. Nevertheless, through the present method, cracks and stress in the protective metal layer are not significant.

The ease of detaching the flat lens structure can be related to the depth of the laser cutting and any microcrack(s) resulting from the picosecond of laser heating and looping curves. The laser cutting depth can be controlled by laser processing parameters such as laser energy fluence, scanning speed, repetition rate, number of laser passes. The microcracks may be able to withstand cleaning and etching operations and yet aid in detachment of the flat lens structure more easily when required. Said differently, the substrate, e.g. quartz, can be cut with a depth such that most of the quartz are removed and yet a very thin delicate/fragile portion remains for the flat lens structure to withstand cleaning and chemical etching before removal (e.g. breaking off) from the substrate to form the resultant optical lens.

The substrate surface may be labelled for controlled release or separation. As an example, after the Cr layers are chemically etched away, the remaining substrate and nanopillars on the lens can be optically transparent and it may then become difficult to visually determine which side has the flat lens (or lenses). This can be overcome if a step of backside alignment lithography is included for rendering a backside marking. Further, the laser cutting can melt a small portion to indicate a mark for this detection purpose.

Example 3

Apparatus Used in Present Method—Tornado Nozzle

One aspect to be considered is a tornado nozzle, which is an apparatus used in the laser dicing equipment and step. The nozzle can be composed of a set of radial convergent divergent nozzles and vacuum outlets that allow for processing in an environment of rotating 400 m/s flow. In certain experiments, without the aid of this nozzle, large particles were ejected during the laser cutting process. These particles were unable to be eliminated by optimizing the laser parameters. A special miniaturized tornado nozzle was customized for the present method. The top-down, bottom-up and the cross section views of the customized tornado nozzle are shown in FIG. 5A to 5C. The large particles, which cause surface damage if they are allowed to stick to the surface, are largely removed, and the quality at edge of lens is also improved.

The regions where particles generated from the laser dicing tend to accumulate can be minimized if the laser cutting is performed from the backside of the substrate. The approach can be conveniently realized after the electronic beam evaporating step for protective metal deposition at the backside of the substrate. Said differently, after the thick protective metal deposition on the back side surface (the side opposite to the surface having the sub-mm flat lens), a thick photoresist can be deposited on the backside surface (the side opposite to the surface having the sub-mm flat lens) and a lithography process in alignment with the lens structure can be performed to produce one or more dicing channels at the wafer backside. The one or more dicing channels may serve as a guide or marker for the laser dicing at the back side of the substrate. For example, the camera of the dicing machine can be used to clearly observe the dicing channels to operate where the laser should cut at the back side. The photoresist can be conveniently removed after dicing. In various instances, the photoresist may be formed on the protective metal layer that has deposited at the backside. Accordingly, the laser dicing in such instances can be carried out from or at the backside.

Example 4

Sub-mm Flat Lens Fabricated from the Present Method

The flat lens can include nanostructures that control a light wave's polarization, phase, and amplitude locally, and can provide arbitrary phase distribution profiles, which are advantageous over traditional bulky lens. The present flat lens are fabricated on a substrate that can be transparent to the wavelength of the light of interest, such as glass, quartz, sapphire with respect to a range of visible light to near infrared (IR) light, or magnesium fluoride ($MgF_2$) for mid-IR light. The sub-wavelength structures that modify the phase distribution of the Gaussian beams could be in a shape of pillar, disk, bar, or slits extending away from the flat lens surface, arranged and fabricated according to the design, and the sub-wavelength structures can be made of low-loss materials (i.e. materials that have a low loss of light transmission) having higher refractive index compared to the substrate, such as $TiO_2$, $Si_3N_4$, GaAlN, GaAlP, for visible wavelength, and Si, a-Si, Ge, $TiO_2$, $Si_xN_y$, GaAlN, GaAlP for near IR and above. For example, the sub-wavelength structures can be in the form of nanopillars fabricated perpendicular to the flat lens surface (e.g. the surface of the flat lens structure that faces away from the substrate).

Example 5

Commercial and Potential Applications

The present method is not limited to sub-mm flat lens fabrication and can be used in fabricating other sizes of flat lens. The flat lens can be fabricated with nanostructures thereon, wherein the nanostructures are for further refinement of light control as discussed above.

The present method is effective for mass fabricating of sub-mm diameter optical lens on, e.g. a glass substrate, in a large volume. The present method is effective in the release and detachment of the one or more optical lenses from the substrate, which allow the one or more sub-mm sized optical lenses to be easily removed from the, e.g. glass or quartz substrate, without damage and/or lost during processing.

The protection technique in the present method can reduce the number of laser cutting loops needed, spread heat from laser pulse, protect the lens surface(s) from sticking of particles generated. The protection layer can also be easily and completely removed after laser dicing.

The specifically designed tornado nozzle can alleviate the particle issue and improve the side wall profile.

The present method can include laser cutting from the backside of the substrate with a pre-produced dicing channel to maximize the flat lens size.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A method of fabricating an optical lens, the method comprising:
   forming a layer of a flat lens structure on a front surface of a substrate;
   depositing a protective metal layer on the layer of the flat lens structure and on a back surface of the substrate, wherein the protective metal layer comprises chromium, gold, titanium, or nickel,
   wherein the back surface is located opposite to and away from the front surface having the layer of the flat lens structure;
   irradiating the protective metal layer at the front surface with a laser to form a channel (i) through the protective metal layer, (ii) through the layer of the flat lens structure and (iii) in the substrate;
   removing the protective metal layer at the front surface and the back surface of the substrate; and
   separating the layer of the flat lens structure from the substrate to obtain the optical lens, wherein the channel has a depth defined by a thickness of the substrate remaining at the channel after irradiating the protective metal layer at the front surface with the laser.

2. The method of claim 1, further comprises cleaning (i) the protective metal layer, (ii) the layer of the flat lens structure and (iii) the substrate after irradiating the protective metal layer at the front surface with the laser and prior to removing the protective metal layer.

3. The method of claim 2, wherein the cleaning comprises subjecting (i) the protective metal layer, (ii) the layer of the flat lens structure and (iii) the substrate to ultrasonication at a power operable to clean (i) the protective metal layer, (ii) the layer of the flat lens structure and (iii) the substrate.

4. The method of claim 1, wherein forming the layer of the flat lens structure comprises depositing an optical material on the substrate, wherein the optical material comprises $TiO_2$, $Si_3N_4$, GaN, AlN, GaP, GaAlN, GaAlP, Si, or Ge.

5. The method of claim 1, further comprises patterning the layer of the flat lens structure to form nanostructures from the layer of the flat lens structure, wherein the nanostructures comprise a material having a higher refractive index than the substrate, wherein the material comprises $TiO_2$, $Si_3N_4$, GaN, AlN, GaP, GaAlN, GaAlP, Si, or Ge.

6. The method of claim 5, wherein the nanostructures extend away from the front surface, and wherein the nanostructures comprise nanopillars, nanodisks, or nanobars.

7. The method of claim 1, further comprising:
   depositing a layer of photoresist on the back surface of the substrate;
   forming one or more channels in the photoresist; and
   removing the photoresist after the irradiating.

8. The method of claim 1, wherein the substrate comprises glass, quartz, sapphire, or magnesium fluoride.

9. The method of claim 1, wherein depositing the protective metal layer comprises depositing the protective metal layer on the front surface and the back surface by electronic beam evaporation or sputtering.

10. The method of claim 1, wherein depositing the protective metal layer comprises depositing the protective metal layer to have a thickness ranging from 80 nm to 400 nm.

11. The method of claim 1, wherein irradiating the protective metal layer at the front surface with the laser comprises irradiating the protective metal layer at the front surface with a single-beam laser.

12. The method of claim 1, wherein irradiating the protective metal layer at the front surface with the laser comprises aligning the laser to the flat lens structure to derive a diameter of the optical lens.

13. The method of claim 12, wherein the diameter of the optical lens is less than 2 mm.

14. The method of claim 1, wherein the laser comprises:
   a pulsed laser having a pulse duration of 10 picoseconds or less; and/or
   a pulse energy ranging from 100 to 200 µJ.

15. The method of claim 1, wherein irradiating the protective metal layer at the front surface with the laser comprises passing the laser through an apparatus having one or more nozzles configured in a manner which minimizes generation of particles from (i) the protective metal layer, (ii) the layer of the flat lens structure and (iii) the substrate.

16. The method of claim 1, wherein removing the protective metal layer comprises chemically etching away the protective metal layer.

17. The method of claim 1, wherein separating the layer of the flat lens structure from the substrate comprises subjecting the flat lens structure and the substrate to ultrasonication at a power operable to have the flat lens structure detach from the substrate.

18. The method of claim 1, wherein the thickness of the substrate remaining at the channel ranges from 50 μm to 100 μm.

19. An optical lens fabricated from the method of claim 1,
   wherein the optical lens comprises a thin layer of the flat lens structure and a plurality of nanostructures that extend away from a surface of the thin layer of the flat lens structure,
   wherein the thin layer of the flat lens structure comprises an optical material, wherein the optical material comprises $TiO_2$, $Si_3N_4$, GaN, AlN, GaP, GaAlN, GaAlP, Si, or Ge, and
   wherein the nanostructures comprise a material comprising $TiO_2$, $Si_3N_4$, GaN, AlN, GaP, GaAlN, GaAlP, Si, or Ge.

20. The optical lens of claim 19, wherein the optical lens has a diameter less than 2 mm.

* * * * *